United States Patent [19]

Cooper

[11] 3,892,871

[45] July 1, 1975

[54] HIGH FRUCTOSE CORN SYRUP JELLIES AND METHOD FOR MANUFACTURE THEREOF

[76] Inventor: Ned Cooper, 4 Naramore Dr., Batavia, N.Y. 14020

[22] Filed: Feb. 19, 1974

[21] Appl. No.: 443,855

[52] U.S. Cl. ............... 426/573; 426/577; 426/575; 426/576
[51] Int. Cl. ............................................. A23l 1/06
[58] Field of Search ........... 426/167, 168, 169, 170, 426/350, 380; 127/31, 30, 71

[56] References Cited
UNITED STATES PATENTS

| | | | |
|---|---|---|---|
| 2,703,757 | 3/1955 | Leo et al. | 426/170 |
| 2,824,007 | 2/1958 | Leo et al. | 426/350 |
| 3,163,543 | 12/1964 | Garfinkle | 426/350 |
| 3,589,909 | 6/1971 | Godzicki | 426/167 |

*Primary Examiner*—A. Louis Monacell
*Assistant Examiner*—J. M. Hunter
*Attorney, Agent, or Firm*—Raymond F. Kramer

[57] ABSTRACT

Edible flavored jellies, such as fruit jellies, are made from corn syrup which includes at least 15% of high fructose content corn syrup, flavor, preferably natural fruit flavor, gelling agent, preferably pectin or modified pectin, and acidifying agent, e.g., citric, phosphoric, malic, tartaric or other suitable acid or mixture of such acids. The jellies made may have sugar solids and flavor contents lower than ordinary jellies, with no loss of product quality. The finished product is stable, resistant to syneresis, even at low pH's and is of improved appearance (glossier), spreadability and "mouth feel". It may be made more efficiently and at lower cost, compared to ordinary jelly making processes, by utilizing a short cook in an open kettle.

14 Claims, No Drawings

HIGH FRUCTOSE CORN SYRUP JELLIES AND METHOD FOR MANUFACTURE THEREOF

This invention relates to jellies made from corn syrup. More particularly, it relates to edible flavored jellies, such as fruit jellies, made from high fructose corn syrup, flavor, gelling agent and acidifying agent. The corn syrup is preferably the only sweetener in the jelly and includes extra fructose, obtainable by the use of at least some high fructose corn syrup. The products made are of improved properties, including appearance, spreadability, mouth feel, flavor enhancement and stability and are readily made by economical methods. Also within the invention is a method of making the jellies which employs a short boil at atmospheric pressure.

In the manufacture of jellies it is usual to employ gelling agents to gel sugars present, which are added as such and/or are in fruit juices that are incorporated. Generally, a mixture of water, sugar (cane or beet) and gelling agent, e.g., pectin, is made and heated to near boiling, at which temperature natural and/or artificial flavors and/or juices, such as fruit flavors and juices are added and the acidity is adjusted by addition of an edible acid. At this point, artificial and natural colors may be added, too. Next, the jellied solution is boiled until a specific gravity of about 62 to 70 Brix is obtained, due to the evaporation of water. The hot liquid is then poured into molds or containers, cooled and allowed to set.

It has been suggested that corn syrup or corn syrup solids could be employed in place of sucrose or invert sugar in making a mixture of sugar and pectin, useful for the manufacture of jellies. U.S. Pat. No. 1,949,657 teaches the making of such food compositions of a creamy, grease-like consistency, with fine sugar crystals uniformly distributed throughout. U.S. Pat. No. 2,369,059 describes household jellies and jams made from pectin, dextrose, corn syrup solids, lemon juice or citric acid, and water. Another U.S. Pat. No. 3,493,394, describes jellies or jams made from corn syrup solids, pectin, fruit juice, water and a pH-adjusting material, such as an acidic substance. In U.S. Pat. No. 3,582,257 an aerated gelled food or spread is made with corn syrup and finally, U.S. Pat. No. 3,615,645 relates to food compositions containing dispersed gels, which gels may include as a component thereof a substantial proportion of corn syrup.

Although the prior art patents mentioned utilize corn syrup as a source of sugar, none of them describes the making of jellies in which the corn syrup is substantially the only sugar employed or wherein the corn syrup is higher in fructose than normal. None recognizes the especially beneficial properties exhibited by the compositions of this invention.

In accordance with the present invention an edible flavored jelly comprises 55 to 67% of corn syrup solids, of which at least 15% is from high fructose corn syrup, a flavoring proportion of a flavoring material, a gelling proportion of a gelling agent, an acidifying proportion of an acidifying agent in sufficient quantity to make the pH of the jelly in the range of 1.5 to 3.5, and water. Preferably, the flavoring material is a natural flavor or a fruit or vegetable juice or mixture thereof, although artificial flavors may also be utilized. The gelling agent is preferably a hydrophilic polysaccharidic gelling agent, such as pectin, but gelatin is also useful. The acidifying agent is preferably an organic acid, such as citric or malic acid, but edible inorganic acids such as phosphoric acid may also be employed. The jelly will usually include corn syrup materials or solids as substantially the only sweeteners therein and will contain additional fructose, such as results from utilizing a high fructose corn syrup either as a part, all or almost all of the corn syrup used to manufacture the jelly. The proportions of the various components are regulated or adjusted to be within certain ranges so as to produce even better products. Also within the invention is a more efficient and simpler method of manufacturing the present jellies.

The jellies made are edible and flavored products, although the techniques and formulations described can also be employed for the manufacture of inedible and/or unflavored gels. The jellies made are usually fruit flavored, although any of various flavors, natural or artificial, may be utilized, and the juices employed for flavoring, sweetening, coloring and bodying purposes may be vegetable juices or those obtained from other natural (or artificial) materials, as well as fruit juices. Usually, however, the jellies will be fruit jellies, with the fruit (or berry) preferably being grape, strawberry, raspberry, cherry, peach, apple, current, crabapple, gooseberry, cranberry, pineapple, blackberry, orange, lemon, lime, grapefruit or guava. Mint jellies are also made, usually being mint-flavored apple jellies, and other flavors may be superimposed on apple jelly or other suitable jelly bases. The various described jellies may be naturally, artificially or juice flavored. Generally, in use, the jellies described will be applied to bread surfaces, as in the making of sandwiches, but, especially when sugar contents are lower, e.g., 15 to 50%, they may also be employed as desserts, like the gelatin desserts presently being marketed.

The juices that may be employed are obtained by squeezing of the fruit and usually will be from 70 to 98% water, although lower water contents may also be present, as where the juices are partially evaporated or otherwise dehydrated. Higher water content juices may be employed, such as those that are diluted during extraction, but usually these are less preferred because one may have to remove additional water from them to promote gelation. Juices employed may be fresh, canned, refrigerated, frozen or in other suitable form or packaging. They may be dehydrated, in concentrated liquid or even solid form, preferably powdered. The powders and concentrates are referred to herein as natural flavors, when the flavoring is over 20% of the preparation. Synthetic flavorings, such as strawberry, grape, pineapple, lemon and mint flavorings, are also useful and in some cases may be employed to reinforce natural flavorings but it is generally preferred to utilize only the natural flavorings and natural juices. Pieces of fruit, berries or vegetables, such as those previously mentioned, may be included in a jelly matrix, usually to the extent of no more than 20% thereof, preferably less than 10%.

The gelling agents which are found satisfactory in accordance with the present invention are those which are suitable for making acidic gels containing substantial proportions of monosaccharides. Among the better gelling agents are the polysaccharides, either naturally or synthetically produced, although the natural polysaccharides and those derived from natural materials are preferred. Also useful are proteinaceous gelling agents, such as the gelatins. Useful polysaccharides, which may be characterized as hydrophilic film formers, are hydrophilic and colloid-forming. They are water dispersible, normally lipophobic and amorphous. Upon addition of the polysaccharides to water they usually form thick sticky masses or gels, even in the presence of very large quantities of water.

Typical polysaccharides are tree and shrub exudations, seaweed colloids, seed extracts, gelatinized starches and starch derivatives, e.g., converted starches, water dispersible cellulose derivatives, pectins, etc. specific illustrations of these polysaccharides include the water-dispersible cellulose derivatives, such as alkali metal carboxymethyl cellulose, e.g., the sodium derivative, hydroxypropylmethyl cellulose, carboxymethyl polymethyl cellulose, hydroxypropylethyl cellulose, hydroxypropyl cellulose; the tree and shrub extracts such as gum tragacanth, gum arabic, ghatti, furcelleran (and salts thereof), gum karaya; seaweed colloids such as agar, carrageenan and salts thereof, e.g., ammonium, calcium, potassium, sodium salts, the alginates (e.g., calcium, potassium, sodium and propylene glycol alginates); gelatinized starches and starch derivatives, e.g., hydroxypropyl starch, modified starches, such as those treated with succinic anhydride, sodium hydroxide and aluminum sulfate; dextrin; pectins such as citric and apple pectins, low methoxyl pectins and sodium pectinate; seed extracts such as locust bean, quince and quar gum and gum-like natural and synthetic hydrophilic colloids such as are disclosed in U.S. Pat. No. 3,301,848; and those described in the Canadian Journal of Chemistry, Volume 42 (1964), pages 1261-1269. Mixtures of the various natural and synthetic hydrophilic colloids and the like may also be utilized.

The acidifying agents that may be employed may be acids or buffers but it is preferred that acids be utilized and that any buffering effects in the jellies be obtained due to the presence of such acids and corresponding salts resulting from reactions with other jelly components. However, if desired, buffer mixes of the acid and a corresponding salt, e.g., an alkali metal or alkaline earth metal salt, may be charged to the jelly pot or kettle. Normally, because of the low pH's of most fruit jellies, the acid will be charged and preferably this will be an organic acid. Among the suitable acids, the most preferred is critic acid but malic acid is also highly acceptable. Other such acids that may be utilized are the sugar acids, e.g., gluconic acid, fumaric acid, tartaric acid, galacturonic acid, ascorbic acid and saccharic acid, for example. However, other edible organic acids may also be employed, with an important consideration for such use in edible jellies being taste. Thus, in some instances, acetic acid, lactic acid and similar strong tasting acids may be utilized. Generally, the higher fatty acids are of insufficient acidities to be useful and some of the lower fatty acids are of objectionable taste. Aromatic acids are usually avoided in food products but small quantities thereof may be employed, sometimes as stabilizers or anti-mold ingredients. Various inorganic acids may also be used but in this group normally only carbonic and phosphoric acids are commercially interesting and of these, phosphoric acid is much preferred.

Corn syrup, the sweetening agent employed in this invention to produce the improved properties of the jellies made, may be considered to be a rather viscous, syrupy liquid which is a mixture of dextrose, maltose and dextrin, with about 20% of water. Normally, such a syrup will have a viscosity in the range of 38° to 47° Baumé, a solids content of 75 to 84%, a moisture content of 15 to 30%, a pH of 4.2 to 5.2 and a density at 100°F. of about 11 to 12 lbs./gallon. The carbohydrate components of such a corn syrup will usually be 30 to 50%, preferably 35 to 45% monosaccharides (dextrose), 20 to 40%, preferably 25 to 35% disaccharides (maltose), 10 to 20% trisaccharides and 10 to 35% other saccharides, e.g., 2 to 6% tetrasaccharides, 2 to 10% pentasaccharides, 1 to 4% hexasaccharides and 5 to 15% higher saccharides. The dextrose equivalent of the corn syrup will normally be from 55 to 70% and the ash content (sulfated) will be from 0.1 to 1%. Such a corn syrup, preferably made by a dual or acid-enzyme process, has an increased percentage of mono-, di- and trisaccharide components, with a corresponding decrease in the higher saccharides fraction. Therefore, the corn syrup is of a lower viscosity and a higher sweetness than ordinary acid-converted corn syrups. However, acid-converted corn syrups may also be employed, at least in part, in carrying out the present invention, although their use is not preferable, compared to the syrup described above.

The high fructose corn syrups employed in making the products of this invention are among the sweetest of corn syrups commercially available. They are normally manufactured by a multiple enzyme process which increases the fructose content of the syrup to a substantial level. Sudh high fructose corn syrups normally will have a solids content of from 65 to 75%, a moisture content of 25 to 35%, a pH of 4 to 4.8, a density of 10.5 to 11.5 lbs./gallon at 100°F., a solids content of 7.5 to 8.2 lbs./gallon at 100°F. and a color (CIRF × 100) of about 0.4. The carbohydrate components of such corn syrups normally comprise from 40 to 60% of dextrose, from 30 to 50% of fructose and from 5 to 10 or 15% of other saccharides. The product has a relative sweetness of about 100.

Although water need not be added as such in the present compositions it is frequently employed, usually as a solvent, to dissolve materials such as colorants or flavorings or to disperse gelling agent. It is preferred for reproducibility of results that it be deionized, having a hardness ion content less than about 10 parts per million of calcium carbonate equivalent. However, hard waters may be employed, with hardnesses as high as 300 p.p.m. If normal tap water is being used it is preferred that the hardness thereof be less than 100 p.p.m., preferably less than 50 p.p.m. Of course, for gelling agents that require calcium for gelling, when soft waters are used and no fruit juices contain the needed ions, this may be added, as in a salt, separately or in other ingredients.

When desired, natural or synthetic colorants may be added, usually to the extent of 0.0001 to 2%, often 0.001 to 1% and preferably 0.002 to 0.2%.

While it is within the scope of the invention to add other materials to the present jellies, such as: preservatives, e.g., sodium benzoate, potassium benzoate, phenolic derivatives, Dowicides, tin salts; clarifying agents, e.g., ethanol; clouding agents, e.g., higher fatty acids; and various other adjuvants, generally it is preferred that no such adjuvants other than preservatives be employed or, if employed, that the total quantity thereof be limited to 5%, preferably 2% and more preferably 0.5%. Preservative contents are usually 0.001 to 1%, preferably 0.01 0.2% and most preferably about 0.1%.

The proportions of the various components of the present jellies, exclusive of any fruits, vegetables or similar particles that might be suspended therein, will be held in certain ranges to obtain the best jellies. Thus, the jellies will normally comprise from 55 to 67% of corn syrup solids (including both "regular" corn syrup solids and high fructose corn syrup solids), from 0.0001 to 10% of flavoring material (exclusive of fruits, vegetables and similar particulate materials), 0.2 to 5% of gelling agent and 0.1 to 2% of acidifying agent, on a final product basis, with the amounts of such materials being on an anhydrous basis. Of course, mixtures of the various components may also be used. Preferably, the contents will be 55 to 63% of corn syrup solids, 0.1 to 5% of flavoring material, 0.3 to 3% of gelling agent and 0.2 to 1.5% of acidifying agent. More preferred ranges are 58 to 61% (or °Brix), 1 to 3%, 0.3 to 1.5% and 0.2 to 1%, respectively. Most preferably, about a 60° Brix jelly is made. In the corn syrup used the high fructose corn syrup solids constitute at least 15%, and preferably 20 to 90% of the total corn syrup solids content, e.g., at least 9 parts of a high fructose syrup with 51 parts of regular syrup in a 60° Brix corn syrup.

The preferred proportions given above are of an edible, flavored jelly based on corn syrup (preferably a mixture of regular and high fructose), pectin gelling agent, phosphoric acid, citric acid, tartaric acid or malic acid as the acidifying agent and natural flavoring material or juice, as the flavoring substance, preferably with the major proportion of the flavoring effect being due to the natural flavor. Of the acidifying agents, citric acid is most preferred in such compositions but malic acid is also good. These two acids are used principally to adjust the acidity for flavor and phosphoric acid is for pH adjustment afterward, but the functions of the acids can be interchanged. Also, the corn syrup solids content is preferably at least about 80% of the content of sugars present in the jelly and preferably is substantially all of it, over 95%.

In a highly preferred and superior jelly composition of the type described in the preceding paragraphs the corn syrup solids are those of a corn syrup or corn syrup mixture containing, on a solids basis, 15% or more or 20 to 90% of high fructose corn syrup and the high fructose corn syrup has at least 25 or 30% of the sugar content thereof as fructose. In highly preferred embodiments of the invention the sugar content of the jelly is entirely or substantially entirely (over 95%) due to the corn syrup sugars present and for most superior sweetening and flavor extending effects the corn syrup employed in almost all of the high fructose type. Nevertheless, jellies based on approximately equal mixtures, e.g., 40 to 60 parts of high fructose corn syrup solids and 40 to 60 parts of "regular" corn syrup solids or of 40 to 60 parts of each of such syrups are stable, tasty, spreadable, etc., and commercially acceptable.

The various proportions given above, while applicable to the manufacture of compositions based on corn syrups, flavorings, gelling agents and acidifying agents broadly, are most applicable to jellies based on the described corn syrup(s), natural flavoring(s), acidifying agent(s) and gelling agent(s). Particularly, they are the proportions that are useful when employing the mentioned sugar mixes and flavors with pectin in the pH range given as for best gelation. Such a pH range is from about 1.5 to 3.5, more preferably 1.5 to 3, and the best gelations are noted at a pH of about 1.8 to 2.2. Above a pH of 3.0 it is desirable to have the jelly of 57.5% or more for good gelling. The gelling agent found most suitable in the mentioned ranges and best for the present jellies is pectin, preferably of low methoxyl content.

Pectins are polygalacturonic acid esters, usually the methyl esters, which on hydrolysis form pectic acid in overripe fruits. Pectin acid forms a jelly with calcium salts, as in the setting of jams and fruit preserves, and has long been known for use in the manufacture of jellies, wherein it forms a gel with sugars present. Calcium salts may be added to the present compositions for gelling purposes if desired and if there are not sufficient quantities thereof present in the fruit juices, corn syrups and water which may be employed to produce adequate gelling and if other gelling actions are insufficient. The pectin used is a powder or a syrupy concentrate. Such materials are obtainable by dilute acid extraction of the inner portions of the rinds of citrus fruits or of fruit pomaces, usually apple. They are normally purified by decolorization, followed by concentration by evaporation, or they may be precipitated with alcohol or acetone. They are available in pure (National Formulary) grade, containing not less than 6.7% of methoxy groups and not less than 74% galacturonic acid and are also available in 150-, 200- and 250-jelly grades, which contain various diluents. The pectins include slow and rapid set pectins, having a wide range of degrees of methylation. The pectins may be employed as their salts, e.g., the alkali metal salts, such as sodium and potassium pectinates, and as other soluble salts. The pectins used may be either methylated or non-methylated and if methylated, will often have a D.M. (degree of methylation) of 72 to 75, normally 73–74. Preferably, powdered pectins will be employed, having particle sizes such that 100% thereof will pass through an 80 mesh screen and about 60% maximum will pass through a 140 mesh screen.

Within the ranges of proportions of materials given it is recognized that for best results variations will be made depending upon the particular constituents employed. Thus, when the gelling agent is stronger than pectin less will be used and when the gelling agent is most effective at a particular pH range an effort will be made to produce a jelly at such a pH, rather than at one in which the effect of the gelling agent is diminished or where it is unstable. Similarly, the right balance of gelling agent, flavor, corn syrup and acidifying agent and the correct proportions thereof will be utilized to produce the most desirable jellies within the ranges mentioned.

The jellies of this invention, especially those based on pectin and substantially on the corn syrup(s) described, with natural fruit flavor(s) and the mentioned acidifying agent(s) have properties generally superior to those of ordinary jellies made with cane, beet or invert sugars. Such properties are important in obtaining commercial acceptances for foods and additionally, allow the present jellies to be made by more efficient methods and at lower costs, which make the jellies of this invention superior competitively to ordinary jellies. Among the superior properties of the present products is improved appearance (the jellies look glossier, shinier, more sparkling), spreadability (the jellies are less grainy and are readily spread on bread or fragile crackers) and mouth feel. This last property is difficult to describe but it has been noted by impartial observers that when eaten the jellies give more pleasant sensations to the tongue and the interior of the mouth. They feel smoother and are more readily dissolved, spreading easily over the mouth surfaces. In addition to the corn syrups being less expensive than ordinary sugars, when jellies are made with them processing is also simpler, leading to additional savings and increasing the capacities of jelly making equipment. The corn syrup jellies appear to enhance most fruit flavors and actually allow a reduction in the quantity of fruit juice or flavor employed. They facilitate replacement of fruit juices with natural (or artificial) fruit flavors and allow a reduction in the total quantity of fruit flavor utilized from 5 to 30% of the amount of the flavoring. Such flavor enhancement is most significant when high fructose corn syrups are employed, either alone or with the regular dextrose-maltose corn syrup. Furthermore, because the high fructose corn syrup has a superior sweetening ability in the present jellies, compared to jellies based on sucrose, dextrose and regular corn syrup, the percentage of total sugar solids in the finished product can be maintained lower than in a regular jelly, with no loss of quality or sweetness. In addition to the saving made in materials, this also facilitates processing. Because the present jellies are of excellent taste characteristics it has been found that they may be made with natural fruit flavors and the use of fruit juices may be omitted. This permits the manufacture of a wide variety of flavored jellies despite the fact that particular fruits or berries may be out of season, since fresh juices are not required. Also, the expense of canning or freezing juices to make them available at other times of the year is obviated and all-year production of any flavored jelly is possible.

The finished jellies produced are stable on storage, mold-resistant and do not form objectionable skins or crystalline precipitates or granules. They are attractive in appearance and coloring agents employed in them, whether natural or synthetic, remain stable on storage. The gels maintain a desired firmness during such storage but do not exhibit objectionable syneresis or fibrous growths, even at low pH, e.g., 1.8.

Other important advantages of the present jellies are those of taste and mouth feel. The jellies dissolve or melt readily and give clean taste and mouth sensations, not being pasty, grainy, gluey, slimy, mealy or chewy. The jellies are pleasant and smooth to the tongue and mouth and liquefy readily so as to permit conveying of flavor essences to the taste buds and olfactory organs, thereby increasing flavoring effects. Additionally, the jellies are of excellent stabilities and freeze-thaw properties.

The components of the present jellies are commercially available and reasonably priced, compared to other jelly ingredients. Also, the manufacturing technique is simple and trouble-free, so that reproducible batches of jelly can be made without the need for extensive processing or for expensive equipment.

To make the present jellies one needs only to mix the various components and heat to an elevated temperature, such as within 10° to 30°F. of the boiling point, e.g., 180° to 205°F., preferably 190°–200°F. and most preferably about 200°F., at which they will all dissolve, after which the mix or solution is boiled at atmospheric pressure for only a very short time, e.g., 15 seconds to 5 minutes, preferably 30 seconds to 2 minutes and often only about 1 minute. The boiling is not to concentrate juices or other liquids and little increase in °Brix is noted. Such increase may be 0° to about 1° or 2° Brix during the manufacturing operations. Thus, one starts with about the desired concentrations of materials and will often want to add water, rather than remove it by boiling. Note that the natural flavors used usually have solids or flavor essence concentrations of about 20 to 45%, preferably 25 to 40% and the liquid present may be water, ethanol or propylene glycol or mixtures. Such solvents need not be boiled off. Boiling is desired to activate the pectin or other gelling agent and increase its gelling power. Also, because the proportion of sucrose in the jelly is small there is no need to boil or otherwise convert it to invert sugar and this is especially true when substantial proportions of the high fructose corn syrup are used and no sucrose is employed.

Because of the saving in boiling time a small plant can make large quantities of the present gels or spreads. The products are nutritious, economical and easy to make. Also, their processing involves great savings of fuel and electricity and causes less pollution and less flavor loss.

After boiling for the desired short time the liquid jelly is poured into containers or molds and is cooled, preferably rapidly, to a lower temperature, preferably room temperature or to within 10°F. of room temperature, so as to set it. Such cooling is usually effected within ten minutes to one hour, preferably within one-half hour. During the cooling it is important not to cause any freezing of moisture in the jelly due to the use of too low a cooling temperature. Cooling is considered to be complete when the interior of the jelly is in the desired temperature range. Although quick cooling is preferred, in some instances, as when cooling equipment is not available, the jellies may be allowed to set by standing in molds or containers at room temperature. Before molding the jelly it may be cooled to 140°F. and tested for the right density. If too low, corn syrup is added and if too high, water is added. Also, the pH may be checked and acid, e.g., phosphoric acid, may be added if too high, and base, e.g., sodium hydroxide or alkaline salt, e.g., sodium citrate, may be added if too low.

In a preferred method of the invention the mixture of corn syrups, any water to be employed and the pectin or gelating agent are mixed together and heated to about 190°–200°F. or a temperature within a range previously given. Before such addition the pectin may be dispersed in part of the corn syrup and the mixture may be dissolved in water. Then natural and/or artificial flavors (juices may be employed, too), such as strawberry, cherry or orange, may be added, following which the acidity of the mix is adjusted with citric acid or other suitable acid, such as phosphoric acid or malic acid (or acidic juice, such as lemon juice). Color (natural fruit colors or synthetic colors, such as F. D. and C. colors) is then added and the solution, initially at about 54° to 66° Brix, is boiled (to a specific gravity of 55° to 67° Brix), after which it is adjusted, poured into jars or molds, cooled and allowed to set.

It is an important advantage of the invention that any heat sensitive components, such as flavors (not juices) and colors, are added after the completion of boiling and sometimes preferably, while the solution is being cooled but is still liquid and before it is poured into molds or containers. Such a method is possible in the manufacture of the present jellies because concentrated flavoring and coloring materials may be used. If desired, the acidifying agent or part thereof may be added with the coloring and flavoring after completion of boiling, so as to more accurately control the final acidity of the jelly. However, usually such acidity can be accurately enough controlled by addition earlier in the process and often such early addition of at least most of the acid(s) further helps to stabilize the jelly flavors, if they are added earlier. Note however, that juices are added before the boil but that due to the shortness of boil their flavors are better.

From the description of the process it is seen that the equipment employed is remarkably simple and the process may be carried out rapidly, thereby greatly increasing the efficiency of the manufacturing operation and allowing production of more jelly from the same equipment and with little plant floor space required. The equipment used is simple and inexpensive, compared to vacuum evaporators often employed. Yet, if desired, so as to prevent even any slight degradation of flavoring materials, such as juices, which may be added early in the manufacturing process, one may employ vacuum evaporation at lower temperatures. Also, if one does not mind accepting the disadvantages he may utilize conventional jelly-making equipment and operations.

The invention is illustrated by the following non-limiting examples. In the examples and in the rest of the specification all temperatures are °F. and all parts are by weight, unless otherwise indicated.

EXAMPLE 1

| | Parts by Weight |
|---|---|
| *High Dextrose Equivalent Corn Syrup ("Regular" 81° Brix, 82% solids content, 43° Baume, 62 dextrose equivalent) | 35.5 |
| **High Fructose Corn Syrup (72° Brix, 71% solids content) | 35.5 |
| Water, deionized | 21.5 |
| No. 150 Grade Pectin (low methoxy) | 0.6 |
| F. D. and C. Certified Food Color (Strawberry, red and yellow, mixed) | 0.05 |
| Citric Acid (50% aqueous solution) | 0.4 |
| Phosphoric Acid (15% aqueous solution) | 0.4 |
| Sodium Benzoate | 0.06 |
| Natural Strawberry Flavor (1:50 rating) | 2.9 |

*Clinton Nusweet "E" Corn Syrup, containing 39% monosaccharides (dextrose), 28% disaccharides (maltose), 14% trisaccharides, 4% tetrasaccharides, 5% pentasaccharides, 2% hexasaccharides and 8% higher saccharides, as the carbohydrate components, 0.4% ash (sulfated) and 18% moisture. The pH is 4.7 and the density at 100°F. is 11.8 lbs./gal.
**Clinton Isomerose 100 Brand High Fructose Corn Syrup, containing 50% dextrose, 42% fructose and 8% other saccharides, as the carbohydrate components, 0.05% ash (sulfated) and 29% moisture. The pH is 4.3, the density is 11.1 lbs./gal. at 100°F. and the color is 0.004 CIRF. Relative sweetness is 100, compared to a 15% solids sucrose solution.

About 10% of the high fructose corn syrup is placed in a steam jacketed kettle and all of the pectin is added, with good agitation. The mix is heated gently with agitation so as to make sure that the pectin is evenly dispersed in the syrup, with no lumping thereof. All the water is added and the temperature is increased to 200°F., with agitation. A tan-colored slurry results. The balance of the high fructose corn syrup and all the rest of the corn syrup are added, while mixing. Then the mix is brought to a boil, while mixing, followed by 1½ minutes of normal boiling without use of the mixer. Sodium benzoate, pre-dissolved in a little of the water (hot) is added to the batch, followed by the color, acids and flavor, with gentle stirring.

When the batch is well mixed a sample is taken and cooled to 140°F. in a closed container under running tap water. The density and pH are checked and are found to be 60° Brix and 2.0, respectively. When the density is lower than 60° Brix a mixture of the corn syrups identical with that utilized is added to the main batch, with stirring, to obtain the correct density. Conversely, when the density is too high, water is added. Acid or base is added accordingly, when the pH is over or under the prescribed value, 2.0, respectively.

After any adjustment of the properties of the jelly mix the mix is filled into sanitary and preferably, sterile containers, with the jelly temperature at the time of filling being at least 180°F. The containers are sealed with a vapor-vacuum capper at a minimum vacuum of 12 inches of mercury. The filled containers are then cooled to a temperature of 90° to 110°F., preferably even lower, e.g., room temperature, as soon as possible, preferably within about 10 minutes.

The product made is an excellent stable jelly, having a shelf life in excess of a year. It is smooth, flavorful and has an excellent mouth feel. It is not grainy, slimy, gluey, stringy, fibrous, hard or wet (syneresis liquid absent). It spreads well on bread or delicate crackers, without breaking the substrate material. In taste tests it equals or surpasses competitive products.

When the proportions of the various materials utilized in the formula are varied, within the range of ± 10% and ± 20% similar good products are made. Similarly, when the pH is changed by different additions of acid(s), so as to be within the range of 1.5 to 3.5, with the Brix being 58 or more and within the range of 1.5 to 3.0 when the Brix is 55 to 57, good jellies are also obtained. Excellent products are also made when there are changes in the flavors, acids, colors, gelling agents, water and corn syrups, as described in the foregoing specification. Non-deionized waters of about 25 to 100 p.p.m. hardness, as $CaCO_3$, are used interchangeably with the deionized water and good jellies are produced, sometimes with slightly greater firmness in the final products.

When the manufacturing method is changed, within the bounds of the description given above, excellent products are also made. Thus, the boiling time may be limited to 1 minute or 30 seconds and cooling may be effected in 30 minutes without adversely affecting the quality of the products. Colorants may be pre-mixed with the flavors and may be added last, after completion of the boil. Vacuum boiling can also be utilized. When such changes are effected the product is essentially the same.

Among the changes in percentages of the mentioned ingredients that are made and still result in a product of the type described are from 35.5 to 20 and from 35.5 to 50 parts by weight for the corn syrups, respectively, from 21.5 to 23 parts for the water, from 0.6 to 0.5 part for the pectin, with a change to 200 grade, from 0.5 to 0.8 part for the colorant, from 0.4 and 0.4 parts for the citric acid and phosphoric acid solutions to 0.6 and 0.1, respectively, from 0.06 to either 0.1 or 0.04 part for the preservative and from 2.9 parts to 1 or 4 parts for the natural flavoring or to 0.05 or 0.5 part for artificial flavoring (strawberry type). Such product can be made by essentially the same method as described hereinabove.

EXAMPLE 2

| | Parts by Weight |
|---|---|
| High Dextrose Equivalent Corn Syrup | 35 |
| High Fructose Corn Syrup | 36 |
| Water | 21 |
| Pectin (No. 150 Grade) | 0.5 |
| Preservative (Sodium Benzoate) | 0.07 |
| Certified Food Color (Raspberry color, blue and red mixture) | 0.03 |
| Citric Acid (50% aqueous solution) | 1.0 |
| Natural Raspberry Flavor (1:50 rating) | 3.1 |

EXAMPLE 3

| | Parts by Weight |
|---|---|
| High Dextrose Equivalent Corn Syrup | 36 |
| High Fructose Corn Syrup | 35 |
| Water | 22 |
| Pectin (No. 150 Grade) | 0.5 |
| Preservative (Sodium Benzoate) | 0.1 |
| Certified Food Color (Cherry color) | 0.07 |
| Citric Acid (50% aqueous solution) | 0.9 |
| Phosphoric Acid (15% aqueous solution) | 0.4 |
| Natural Black Cherry Flavor (1:50 rating) | 2.9 |

EXAMPLE 4

| | Parts by Weight |
|---|---|
| High Dextrose Equivalent Corn Syrup | 35 |
| High Fructose Corn Syrup | 35 |
| Water | 21 |
| Pectin (No. 150 Grade) | 0.7 |
| Sodium Benzoate | 0.6 |
| Certified Food Color (Orange) | 0.09 |
| Citric Acid (50% aqueous solution) | 1.1 |
| Natural Orange Flavor (1:500 rating) | 0.25 |

EXAMPLE 5

| | Parts by Weight |
|---|---|
| High Dextrose Equivalent Corn Syrup | 36 |
| High Fructose Corn Syrup | 36 |
| Water | 22 |
| Pectin (No. 150 Grade) | 0.6 |
| Sodium Benzoate | 0.06 |
| Certified Food Color (Mixed red, yellow and blue) | 0.05 |
| Citric Acid (50% aqueous solution) | 0.9 |
| Natural Mixed Fruit Flavor (1:25 rating) | 1.7 |

The jellies of formulas of Examples 2–5 are made by the method of Example 1 and the starting materials, except for the flavorings and colorants, are the same. The jellies made possess the desirable properties mentioned in the discussion after Example 1 and are highly acceptable commercial products.

When various changes are made in the formulas, within the ambit of the invention, as previously described, good products also result. For example, when ordinary corn syrup is substituted for one-third or one-half of the High Dextrose Equivalent Corn Syrup of Examples 2–5 the product made is still very good and this is also the case when the proportion of the High Fructose Corn Syrup is increased to twice that of the total of the other corn syrups present. In fact, increasing the proportion of the high fructose ingredient significantly improves the jelly. Also, when five, ten and twelve parts of the High Dextrose Corn Syrup are replaced by sucrose the product is commercially acceptable, too. Other changes made are in the pectin, with an equivalent weight of ordinary citrus or apple pectin being substituted and with 75 and 60% respectively of 200 and 250 grade pectin (low methoxy) being used, too, to produce jellies of the invention. Tap water of 40 p.p.m. $CaCO_3$ equivalent hardness is also used interchangeably with the deionized water and in some cases calcium hardness, as lime, is added to waters to bring the hardness therein to about 80 p.p.m. In all such cases good jellies of the properties of the previous products are made. In a similar fashion changes are made in the colorants employed to suit the custom of the trade as to color and such changes are also made in quantities of flavors and acids used. The products made are especially good jellies of the desired properties previously mentioned. Thus, when flavors, colors and acid contents are varied ± 30%, with the acidities still being in the 1.5 to 3.0 pH range, excellent products are obtainable.

EXAMPLE 6

| | Parts by Weight |
|---|---|
| High Dextrose Equivalent Corn Syrup | 35.5 |
| High Fructose Corn Syrup | 35.5 |
| Water | 10.5 |
| Pure Grape Juice | 10.5 |
| Pectin (No. 150 Grade) | 0.6 |
| Preservative (Sodium Benzoate) | 0.06 |
| Certified Food Color | 0.05 |
| Malic Acid (38% aqueous solution) | 0.5 |
| Phosphoric Acid (15% aqueous solution) | 1.0 |
| Natural Grape Flavor (1:50 rating) | 0.5 |

The jelly of this example is made like those of the previous examples except that the grape juice is added with the water or sometimes, shortly thereafter. In some variations in the manufacturing method the heating is to 190°F. and the boil is conducted at that temperature, under vacuum, for 1 minute. An excellent jelly of the desired flavor, stability, appearance, mouth feel and general palatability results from either the usual or modified production method when the present formula is employed or when variations thereof are made, as described in the foregoing examples.

The invention has been described with respect to specific formulas and illustrative examples but it is not to be considered to be limited to these. One of skill in the art will be able to utilize equivalents and substitutes for parts of the formula and the process without departing from the spirit of the invention.

What is claimed is:

1. An edible flavored jelly comprising 55 to 67% of corn syrup solids, of which at least 15% of the amount of corn syrup solids present is from high fructose corn syrup, a flavoring material, 0.2 to 5% of a gelling agent, an acidifying agent in sufficient quantity to make the pH of the jelly in the range of 1.5 to 3.5, and water.

2. A jelly according to claim 1 wherein the flavoring material is selected from the group consisting of fruit and vegetable juices, natural flavors and artificial flavors, the gelling agent is selected from the group consisting of hydrophilic polysaccharidic gelling agents and gelatin and the acidifying agent is selected from the group consisting of phosphoric acid and organic acids.

3. A jelly according to claim 2 wherein the gelling agent is pectin or a modified pectin and the acidifying agent is phosphoric, citric or malic acid.

4. A jelly according to claim 1 wherein the gelling agent is a pectin and the acidifying agent is critic acid.

5. A jelly according to claim 1, consisting essentially of 55 to 63% of corn syrup solids, 0.0001 to 10% of flavoring material, 0.2 to 5% of gelling agent, 0.1 to 2% of acidifying agent and water, with such proportions given being proportions of the final product constituted by anhydrous forms of the materials described.

6. A jelly according to claim 5 wherein the corn syrup solids content is at least 80% of the total sugar content of the jelly and 20 to 90% of the corn syrup solids is from high fructose corn syrup, and which jelly contains 58 to 61% of corn syrup solids, 0.1 to 5% of flavoring material, 0.3 to 1.5% of gelling agent and 0.2 to 1% of acidifying agent, on the same basis as in claim 5, with the flavoring material being a natural flavor or juice, the gelling agent being pectin and the acidifying agent being selected from the group consisting of citric acid, malic acid and phosphoric acid and mixtures thereof which makes the pH of the jelly 1.5 to 3.

7. A jelly according to claim 1 wherein the corn syrup solids are of a corn syrup containing, on a solids basis, 20 to 90% of high fructose corn syrup, in which high fructose corn syrup at least 25% of the sugar content is fructose, at least 80% of the total sugar content of the jelly is of corn syrup solids, and which jelly contains 58 to 61% of corn syrup solids, 0.1 to 5% of flavoring material, 0.3 to 1.5% of gelling agent and 0.2 to 1% of acidifying agent, on the same basis as in claim 5, with the flavoring material being a natural flavor or juice, the gelling agent being pectin and the acidifying agent being selected from the group consisting of citric acid, malic acid and phosphoric acid and mixtures thereof which makes the pH of the jelly 1.5 to 3.

8. A jelly according to claim 6 wherein the corn syrup solids are at least 25% fructose.

9. A jelly according to claim 8 wherein substantially all of the sugar content is from corn syrup.

10. A jelly according to claim 7 wherein the corn syrup solids are those of a mixture of about 40 to 60 parts of high fructose corn syrup solids containing about 40 to 60% of dextrose, about 30 to 50% of fructose and about 5 to 15% of other saccharides and about 40 to 60 parts of corn syrup solids containing about 30 to 50% of dextrose, about 20 to 40% of maltose, about 10 to 20% of trisaccharides and about 10 to 35% of other saccharides, the pH is in the range of 1.8 to 2.2, the viscosity is about 60° Brix and which contains 0.01 to 0.2% of a preservative.

11. A method of manufacturing an edible flavored jelly comprising corn syrup solids, of which at least 15% thereof are from high fructose corn syrup, flavoring material, gelling agent, acidifying agent and water which comprises heating a mixture of such materials for from 15 seconds to 5 minutes, with the final corn syrup solids content, plus other sugar content, when present, being 55 to 67%, said heating being effected at about atmospheric pressure and at a temperature within 30°F. boiling, pouring the liquid jelly into containers and cooling and setting it.

12. A method according to claim 11 wherein the jelly consists essentially of 55 to 63% of corn syrup solids, of which 20 to 90% thereof is of high fructose corn syrup solids, 0.0001 to 10% of flavoring material, 0.2 to 5% of gelling agent, 0.1 to 2% of acidifying agent and water, such proportions given being proportions of the final product constituted by anhydrous forms of the materials described, the pH of the jelly is in the range of 1.5 to 3.5 and the heating is for 30 seconds to 2 minutes and is to about the boiling point.

13. A method according to claim 12 wherein the corn syrup solids content is at least 80% of the total sugar content of the jelly and the jelly contains 58 to 61% of corn syrup solids, 0.1 to 5% of flavoring material, 0.3 to 1.5% of gelling agent and 0.2 to 1% of acidifying agent, on the same basis as in claim 12, and with the flavoring material being a natural flavor or juice, the gelling agent being pectin and the acidifying agent being selected from the group consisting of citric acid, malic acid and phosphoric acid and mixtures thereof which makes the pH of the jelly to 1.5 to 3.

14. A method according to claim 13 wherein the corn syrup solids contain at least 25% of fructose, substantially all of the sugar content of the jelly is from corn syrup solids and the jelly pH is from 1.8 to 2.2.

* * * * *